Aug. 4, 1953 — L. A. CASNATI — 2,647,785
SANITARY HOLDER FOR ARTICLES
Filed Feb. 19, 1949 — 2 Sheets-Sheet 1
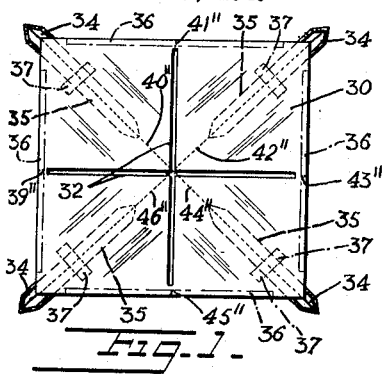
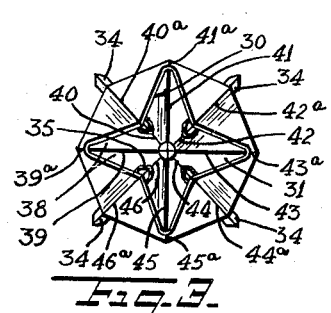
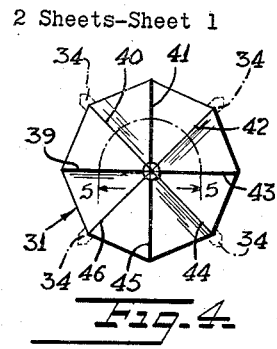
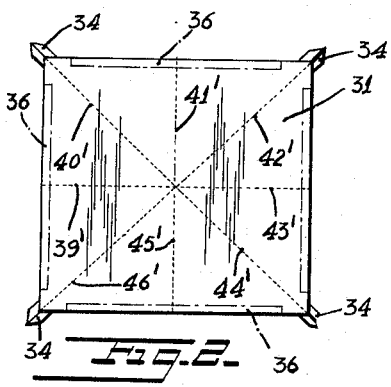
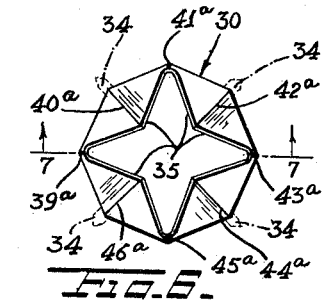
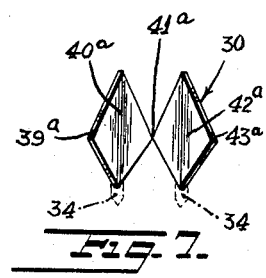
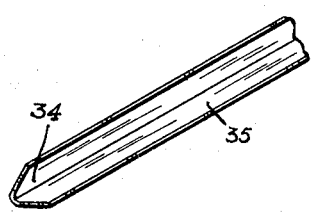
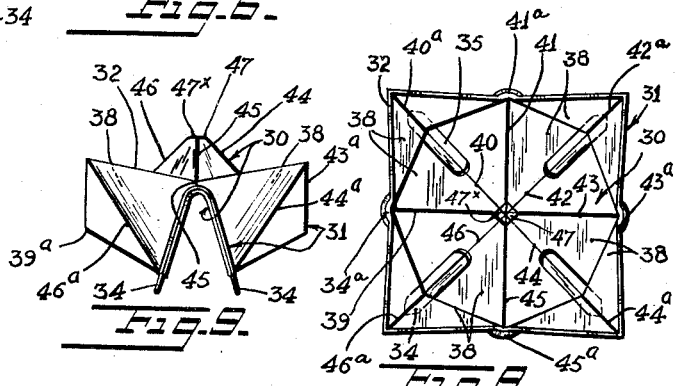
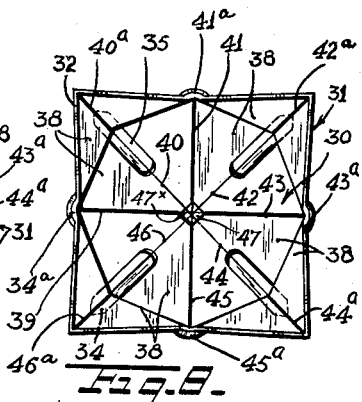
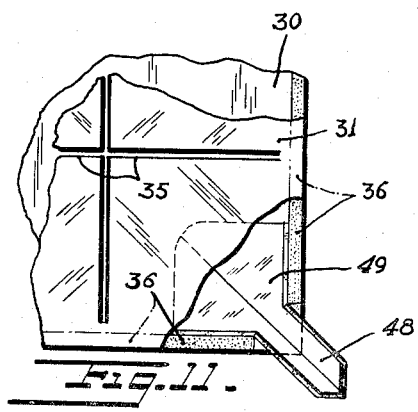
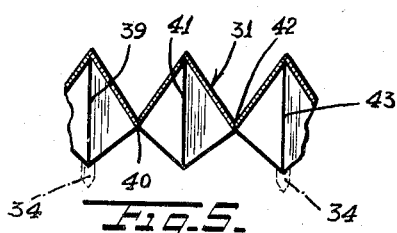
INVENTOR.
LOLA A. CASNATI
BY
*Gottau Holschek*
ATTORNEY Aug. 4, 1953 — L. A. CASNATI — 2,647,785
SANITARY HOLDER FOR ARTICLES
Filed Feb. 19, 1949 — 2 Sheets-Sheet 2
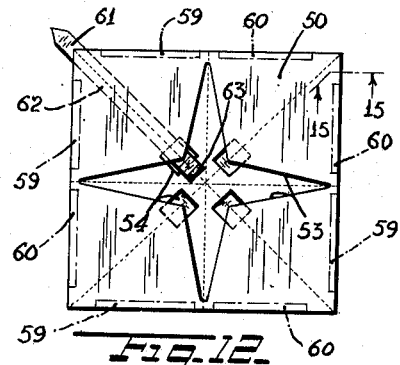
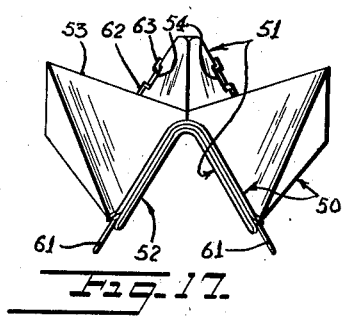
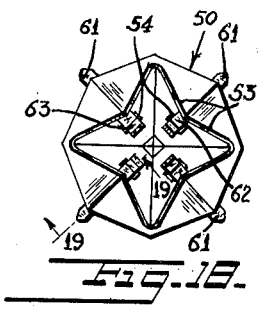
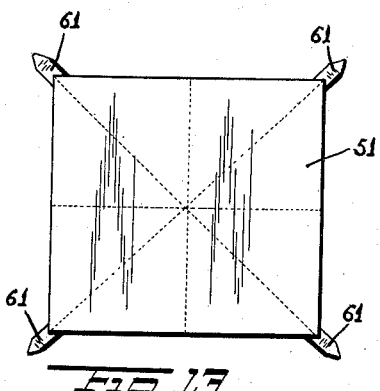
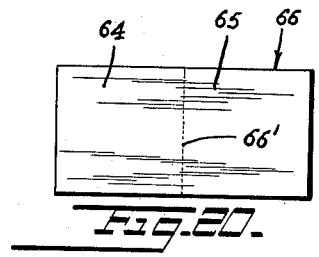
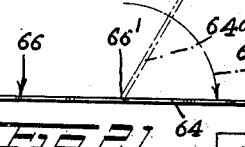
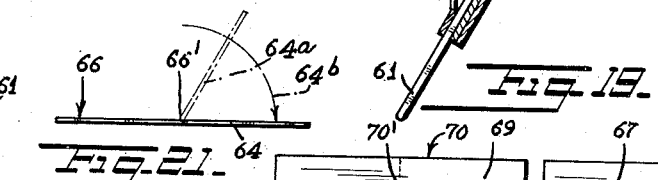
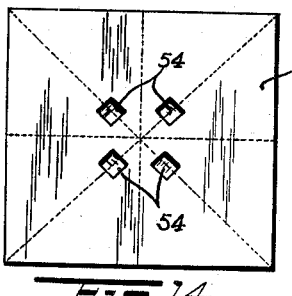
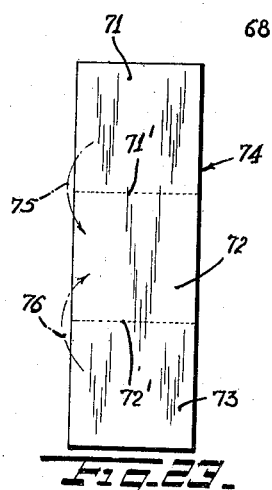
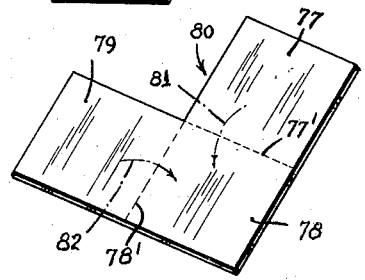
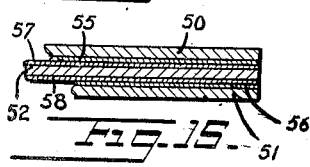
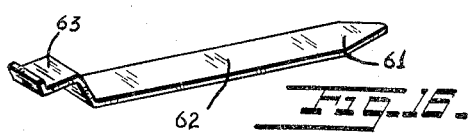
INVENTOR.
LOLA A. CASNATI
BY
ATTORNEY Patented Aug. 4, 1953

2,647,785

UNITED STATES PATENT OFFICE 2,647,785

SANITARY HOLDER FOR ARTICLES

Lola A. Casnati, New York, N. Y.

Application February 19, 1949, Serial No. 77,410

19 Claims. (Cl. 294—25)

1

This invention relates to new and useful improvements in sanitary holders of the kind disclosed in my U. S. Patent No. 2,373,651; such holder being made by folding a sheet or blank of paper or the like in such manner that the holder incorporates an upwardly directed central collapsible apex portion, and a plurality of downwardly directed side pocket portions into which side pocket portions may be engaged one's fingers for compressing the side pocket portions toward each other by temporarily resiliently compressing said central apex portion. Incidental to such collapse, the bottoms of the side pocket portions are moved in toward each other.

In this way said pocket bottoms are employable as artificial fingers, for gripping, holding and picking up various articles, while direct contact between the human hand and such an article is avoided, and therefore the fingers of the hand are shielded from chemicals in the articles and vice versa. Said artificial fingers are usable for picking up all kinds of articles, for instance, wads of cotton and the like.

According to the patent aforesaid, and also according to my U. S. patent applications Ser. No. 790,419, filed December 8, 1947, and now Patent No. 2,471,308, and Ser. No. 40,217, filed July 23, 1948, and now Patent No. 2,561,842, a single blank of paper or some other suitable sheet material is folded to produce a holder incorporating the portions above enumerated.

An object of the present invention is to provide a holder having, as well as all the advantages of my aforesaid previous proposals, further and unique advantages as will become clear hereinafter, but particularly the advantage of very considerably reducing the number of necessary folds and folding operations. In this regard a feature of the present invention is the use of a plurality of preferably square blank sections, one to be superposed relative to another. In the now appraised best ways of carrying out the invention, said sections may be two or three in number. In either of these two last-mentioned cases, the said sections may be separate square blanks, or integral subdivisions of a single elongate blank, with or without the addition of another square blank to provide a third section in a three-section type holder. When a single elongate blank is used, this blank could be oblong in shape, or, in the case of a three-section type holder, or L-shaped extension.

A feature of the present invention is the use of an adhesive element, impregnated in, or coated on, or inherent in the nature of a material constituent of, the said sections, whereby, when the sections are superposed one relative to another, they may be bonded together by such adhesive for maintenance of the sections against separation and may at the same time be given especially located elongate structural additions established by such adhesive and which function as equivalents of and substitutes for certain of the folds obviated by the invention; and whereby also elongate rib-like members each for carrying one of four picker-fingers desirably carried by the holder for projection from the bottoms of the aforesaid side pocket portions and for directly engaging and seizing an article to be handled, may be securely held in their appointed locations between a pair of immediately adjoining sections. Such adhesive being preferably of the type which is not tacky at ordinary temperatures, but which becomes tacky incidental to the application of heat or heat and pressure thereby for becoming and thereafter remaining a dependably functioning or set adhesive agent. A good such adhesive may be constituted by such a material as a polymerizable or heat-setting resinous plastic.

It is a further object of this invention to construct a novel sanitary holder which is simple and durable, which may be quickly and easily assembled by the user, which can be replaced at a small cost, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view showing a now favored embodiment of the invention, as completed, but not yet folded up from the flat, yet with certain foldings indicated in dotted lines and with certain adhesively bonded areas indicated in dot and dash lines; this holder incorporating two sections each a separate blank.

Fig. 2 is a bottom plan view of the holder of Fig. 1, also in the flat.

Fig. 3 is a top plan view of said holder, folded up from the flat but only at an initial stage in opening up the same to spread the side pocket portions.

Fig. 4 is a top plan view of the bottom blank, with the folds thereof disposed in correspondence with the showing of Fig. 3, and with the locations of the picker-fingers indicated in dot and dash lines.

Fig. 5 is a developed section taken along the line 5—5 of Fig. 4.

Fig. 6 is a view similar to Fig. 4, but showing the top blank only.

Fig. 7 is a vertical section, taken on the line 7—7 of Fig. 6.

Fig. 8 is a view like Fig. 3, but with the side pocket portions widely opened up.

Fig. 9 is a side elevational view of the holder as opened up in Fig. 8.

Fig. 10 is a perspective view, on an enlarged scale, of one of the four rib-like members which carry the four picker-fingers.

Fig. 11 is an enlarged fragmentary view, showing a modification characterized by a plate-like member for integrally carrying a picker-finger.

Fig. 12 is a view similar to Fig. 1, but showing another now favored embodiment of the invention; with, however, for clarity of the drawing, only one of the four rib-like members shown present.

Fig. 13 is a bottom plan view of the holder of Fig. 12; this holder being one which incorporates three sections each a separate blank.

Fig. 14 is a plan view of the section which is interposed between the two blanks each uppermost in, respectively, Figs. 12 and 13.

Fig. 15 is an enlarged fragmentary detail section, taken on the line 15—15 of Fig. 12.

Fig. 16 is a perspective view, on an enlarged scale, of one of the four rib-like members for providing the four picker-fingers shown in Figs. 13, 17 and 18.

Fig. 17 is a view like Fig. 9, but slightly enlarged, and showing the holder of Figs. 12-14 side elevationally, with said holder opened up at its four side pocket portions to an extent corresponding to that indicated in Figs. 8 and 9.

Fig. 18 is a view like Fig. 3, but in regard to the holder of Figs. 12-14.

Fig. 19 is a greatly enlarged detail sectional view, taken on the line 19—19 of Fig. 18.

Fig. 20 shows a single blank incorporating two sections, for use in making a holder pursuant to the invention and like that of Figs. 1 and 2 so far as is concerned the inclusion in the holder of merely two sections.

Fig. 21 illustrates a folding of such blank to superpose said sections one relative to another.

Fig. 22 is a collective view showing a pair of blanks with one incorporating two sections and the other providing a third section, for use in making a holder pursuant to the invention and like that of Figs. 12-13 so far as is concerned the inclusion in the holder of three sections, one to lie over another.

Fig. 23 shows a single blank incorporating three sections.

Fig. 24 shows another form of blank incorporating three sections.

Throughout the drawings, in various views, thicknesses are considerably exaggerated, to make such views clearer; and Figs. 20-24, being primarily schematic, are drawn to a reduced scale.

The sanitary holder according to the present invention, as preferably carried out and as shown herein, involves the use of two or more sections of the same square outline. Such squares are blanks, or parts of a blank or blanks, formed of a material desirably of the type including a paper or like sheet base and coated, on one side or both sides of a blank, with any of the well-known materials which at ordinary temperatures are not tacky but which become tacky incidental to the application of heat or heat and pressure, whereby when a thus coated side of a blank is facewisely engaged with another blank a thereafter permanently persisting and strong bond results between the thus contacted blanks at the location or locations of the heat or heat and pressure treatment, following cessation of said treatment.

Referring now particularly to Figs. 1-9, the holder here shown includes two separate blanks, each providing one of two square sections 30 and 31. Each of these blanks, on one side thereof, has a coating of the kind hereinabove explained, and the sheets are matchingly stacked with their said coated sides facing each other. The upper sheet 30 as thus placed in the stack is provided with a cruciform slot or slitting 32; and both blanks are given four lines of fold matchingly located as indicated in dotted lines in Figs. 1 and 2; two of these lines being diagonally extended and the other two thereof being parallel with the sides of the blanks. Since these four lines of fold intersect at the center of the stack, in one sense eight lines of fold are provided, all radiating from said center and spaced 45° apart; it being noted that four of said eight lines of fold lie along the four arms of the slot 32.

The four picker-fingers 34 are end portions of four elongate and longitudinally folded rib-like members 35, each conveniently made of a suitable plastic. These members are arranged as shown in Fig. 1, with their lines of fold locationally matching four diagonal lines of fold in the stack of blanks 30 and 31.

The blanks 30 and 31 are bonded together, as along the four linearly extending areas marked 36 and partially bounded by dot and dash lines in Figs. 1 and 2, by heat or heat and pressure application as already mentioned. Such areas extend at opposite ends almost to the corners of the two blanks, but said ends are spaced from said corners to leave an opening between the two blanks at each corner for the extension therebeyond of a picker-finger 34 as shown. The members 35 may be held as thus positioned, against endwise shift thereof, in any suitable manner. For instance, they may be thus anchored by employing the heat or heat and pressure at the four bar-like smaller areas marked 37 and outlined in dot and dash lines in Fig. 1, for bonding the upper side of the bottom blank 31 adjacent to said areas to the bottoms of the members 35.

This having been done, the holder is completed and is ready for responding to the foldings of the blanks 30 and 31 in manually opening up the holder to provide its four finger-holding side pockets 38 as will below be explained.

Then, as will be noted from Figs. 3 and 4, the portions of the blank 30 which in Fig. 1 substantially flatly overlie the members 35 must be free to be moved away from the portions of the blank 31 to which said members are bonded. In order to avoid, during such bonding, an unintentional adhesion of the said portions of the blank 30 to the members 35, a sheet of a suitable material, of a nature not able to be bonded to the adhesive coatings on the blanks 30 and 31, may be temporarily inserted between the members 35 and the blank 30; such sheet being of a size to be later readily withdrawn through the slot 32 on opening up the latter, say as indicated in Fig. 8. However, the need to avoid bonding of the members 35 to both the blanks 30 and 31 would not be present were said members bonded to the two blanks fairly close to the corners of the blanks, as this will not interfere with adequately wide opening of the side pockets 38. Thus, if said members are to be bonded to both sheets, the heat or heat and pressure application would be not only at the areas 36 but also at areas adjacent to the four corners of the stack of blanks.

Comparing Figs. 1 and 2 with Figs. 3 through 9, the various folds made in pursuance of the dotted lines of fold indicated in Figs. 1 and 2 may be readily identified in Figs. 3–9, when it is explained that reference numerals with primes added are applied to various lines of fold in Fig. 2 and respectively corresponding reference numerals but without primes are applied to the resulting folds of Figs. 3–5 and Fig. 9, and that reference numerals with double primes added are applied to various lines of fold in Fig. 1 and respectively corresponding reference numbers but with the suffix a added are applied to the resulting folds of Figs. 3 and 6–9. Note, in Fig. 6, the reshaping of the cruciform slot 32; comparing 6 with Fig. 3.

In other words, as will be observed, and now speaking in terms of Figs. 1, 3, 8 and 9, the folds which extend diagonally of the stack of blanks of the holder are all upwardly directed, and the alternating folds, those which extend parallel to the sides of the stack of blanks, are downwardly directed; thereby to result in the provision of the four side pockets 38 and the central upwardly directed apex portion, the latter marked 47. The reference numerals applied as above to the said folds are 39 to 46, both inclusive.

With the holder expanded somewhat more than as shown in Fig. 3 but rather less than as shown in Figs. 8 and 9, and with the fingers of a person's hand placed in the four side pockets 38, these all of inverted four-sided pyramidal shape and uniformly spaced around the upwardly directed central apex portion 47 (this marked with such numeral only in Fig. 9, but readily identifiable in Fig. 8, where to add such numeral would unnecessarily perhaps confuse the latter view), the four picker-fingers 34 are extended as illustrated in Figs. 3 and 9, and the fingers of said hand may be slightly spread, preparatory to seizing an article to be handled while gripped by said fingers, and then brought together to cause said fingers to seize the article, whereby, with the holder non-slippably clinging to said hand, the article may be lifted and deposited where desired. The reference numeral 47× of Fig. 9 indicates the ordinarily automatically effected slight flattening of the apex portion 47.

Referring to the modification shown in Fig. 11, a portion of the upper blank 30 and a portion of the lower blank 31 are shown; the heat bonded areas 36 here seen being stippled where exposed by break away of the sheet 30. Fig. 11 illustrates an arrangement whereby the four picker-fingers may be mounted for retention in place without bonding their carrying members to either of said sheets. The one of such fingers shown in Fig. 11 and marked 48 is, it will be noted, integral with a plate-like carrier 49 shaped so as to be keyed in position by the adjacent margins of the nearby bonded areas 36.

Referring to the embodiment of Figs. 12–19, the holder here shown includes three separate blanks, each providing a different one of three square sections 50, 51 and 52. The top blank 50 is provided with a quasi-star-shaped cruciform opening 53 corresponding in function to the slitting 32. The bottom blank 51 is of uninterrupted expanse all over. The intermediate blank 52 is provided with four rectangular openings 54. As shown in Fig. 15, the underside of the top blank 50 is provided at its underside with a coating 55 of the kind aforesaid; the upper side of the blank 51 is provided with such a coating, this marked 56; and both sides of the blank 52 are provided with like coatings, these marked 57 and 58.

All three blanks have matchingly located lines of fold as indicated in dotted lines in Figs. 12, 13 and 14; and along such lines (after the blanks are stacked, and by the heat or heat and pressure procedure already explained have been marginally interconnected as along the elongate areas partially bounded by dot and dash lines in Fig. 12 and there marked 59 and 60), folds are made which are mutually related exactly as above explained in connection with the holder of Figs. 1–9. It will be noted that along each of the four sides of the stack of blanks the two bonded areas 59 and 60 at such side are spaced apart a short distance at about the middle of the length of said side, to avoid stiffening too much the ends of the folds which parallel the sides of the stack of blanks. Such an arrangement is especially desirable in a holder made of more than two sections; although the same could, of course, be used in connection with the holder of Figs. 1–9.

In connection with the holder of Fig. 12, picker-fingers 61 are illustratively shown which are flat spatulate end portions of flat rib-like members 62, which may be made of any material, as a suitable plastic. Said members 62 have Z-bent upper end portions 63, these for interlocking, respectively, with the four openings 54 through the intermediate sheet 52, when all four of the members 62 are arranged as shown in Figs. 13 and 17–19, and as to one of said members as shown in Fig. 12.

When the holder is opened up, first as in Fig. 18, and then further toward the widely opened condition of Fig. 17, it may be used as described in connection with the holder of Figs. 1–9; it being noted that in the holder of Figs. 12–19 elements corresponding to the four side pockets 38 and the central upstanding apex portion 47 are all present.

Figs. 20 and 21 are self-explanatory, with here one of the sections 64 and 65 of the blank 66 corresponding to the section 30 and the other corresponding to the section 31; as a result of making use of the fold line 66¹ as indicated by the dot and dash showings 64ª and 64ᵇ.

In Fig. 22, in regard to the section constituted by the blank 67 and to the two sections 68 and 69 included in the blank 70, each of a different one of said sections may be employed as an equivalent of a different one of the sections 50, 51 and 52; by use of the fold line 70'.

The statement last made is true also of the three sections 71, 72 and 73 of the columnar blank 74; by use of the fold lines 71' and 72' as indicated by the arrows 75 and 76.

The same statement applies in relation to the three sections 77, 78 and 79 of the L-shaped blank 80; by use of the fold lines 77' and 78' as indicated by the arrows 81 and 82.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A sanitary holder, for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough with the arms of said opening extended parallel to the side edges of said section at the top of said structure.

2. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough with the arms of said opening extended parallel to the side edges of said section at the top of said structure, all of said sections being substantially square, and four of said folds being diagonal to such square and extended to a different one of the four corners of the square, two others of said folds being substantially parallel with two opposite sides of the square and the remaining two folds being substantially parallel with the two other sides of the square.

3. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough with the arms of said opening extended parallel to the side edges of said section at the top of said structure, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, said sections being two in number and each being a separate blank.

4. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough with the arms of said opening extended parallel to the side edges of said section at the top of said structure, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, said sections being two in number and each being a subdivision of a single blank folded on itself.

5. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough with the arms of said opening extended parallel to the side edges of said section at the top of said structure, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, said sections being three in number and each being a separate blank.

6. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough with the arms of said opening extended parallel to the side edges of said section at the top of said structure, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, said sections being three in number and each being a subdivision of a single blank folded on itself.

7. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough with the arms of said opening extended parallel to the side edges of said section at the top of said structure, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, said sections being three in number and each being a subdivision of a single blank folded on itself, said blank being columnar so that said sections are longitudinal subdivisions of said blank.

8. A sanitary holder for picking up small articles, comprising a structure of foldable sheet material and having an upwardly directed central apex portion and a plurality of downwardly directed side pocket portions into which one may engage one's fingers for pressing said pocket portions toward each other, one of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, there being a plurality of members interposed between adjoining sections and extended along said diagonal folds and integrally carrying picker-fingers projected beyond the inner ends of such side pockets.

9. A sanitary holder for picking up small articles, comprising a structure of foldable sheet material and having an upwardly directedly central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, there being a plurality of members interposed between adjoining sections and extended along said diagonal folds and integrally carrying picker-fingers projected beyond the inner ends of such side pockets, said sections being present to a total of three, and said members being interposed between the uppermost section and the section next therebelow.

10. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporting a pair of rectangular sheet material sections one superposed on another and secured together adjacent side portions thereof, said structure having eight folds all meeting substantially at the center of a section, and the section at the top of said structure having a cruciform opening therethrough, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, there being a plurality of members interposed between adjoining sections and extended along said diagonal folds and integrally carrying picker-fingers projected beyond the inner ends of such side pockets, said sections being present to a total of three, and said members being interposed between the uppermost section and the section next therebelow, said members being elongate, and there being means for restraining said members against endwise shift, said means including cut outs in the last-named section and formations on the inner ends of said members for interlocking engagement with said cut outs.

11. A sanitary holder for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough, all of said sections being substantially square, and four of said folds being diagonal to such square and extended to a different one of the four corners of the square, two others of said folds being substantially parallel with two opposite sides of the square and the remaining two folds being substantially parallel with the two other sides of the square, there being a plurality of members interposed between adjoining sections and extended along said diagonal folds and integrally carrying picker-fingers projected beyond the inner ends of such side pockets, said sections being present to a total of three, and said members being interposed between the uppermost section and the section next therebelow, said members being elongate, and there being means partially carried by the last-named sheet and partially carried by the inner ends of said members for impositively mechanically fixing said members against endwise shift.

12. A sanitary holder, for picking up small articles, comprising a structure of foldable sheet material and having an upwardly directed central apex portion and a plurality of downwardly directed side pocket portions into which one may engage one's fingers for pressing said pocket portions toward each other, each of said pocket portions being of the shape of an inverted four-sided pyramid, said structure incorporating a pair of rectangular sheet material sections one superposed on another and secured together adjacent side portions thereof, said structure having eight folds all meeting substantially at the center of a section, and the section at the top of said structure having a cruciform opening therethrough, the material of said sections incorporating a material normally non-tacky but which becomes set as a bonding agent in response to the application of heat, the aforesaid securement together of said sections adjacent to side portions thereof being constituted set portions of such bonding agent.

13. A method of forming a sanitary holder, which comprises forming a square top section of material with a cruciform opening having its arms extended parallel to the sides thereof and the ends of its arms stopping short of the sides of said top section, forming a square bottom section similar in size and shape to said top section, folding said sections in quarters to provide fold lines with the fold lines extended parallel to the arms of said cruciform opening, providing said sections with additional fold lines extended diagonally from corner to corner, superimposing said top section on said similar square bottom section of material, and bonding together the adjacent edge portions of said sections of material except at their corners.

14. A method of forming a sanitary holder, which comprises forming a square top section of material with a cruciform opening having its arms extended parallel to the sides thereof and the ends of its arms stopping short of the sides of said top section, forming a square bottom section similar to said top section, folding said sections in quarters to form fold lines extended parallel to the arms of said cruciform opening, providing said sections with additional fold lines extended diagonally from corner to corner, superimposing said top section on said similar square bottom section of material, bonding together the adjacent edge portions of said sections of material except at their corners, and opening said section of material along said fold lines to provide an upwardly directed central apex portion and a plurality of downwardly directed side pocket portions.

15. A method of forming a sanitary holder, which comprises forming a square top section of material with a cruciform opening having its arms extended parallel to the sides thereof and the ends of its arms stopping short of the sides of said top section, forming a square bottom section similar to said top section, folding sections in quarters to form fold lines extended parallel to the arms of said cruciform opening, providing said sections with additional fold lines extended diagonally from corner to corner, coating the inner faces of said sections of material, superimposing said top section on said similar square bottom section of material, and bonding together the adjacent edge portions of said sections of material except at their corners.

16. A method of forming a sanitary holder, which comprises forming a square top section of material with a cruciform opening having its arms extended parallel to the sides thereof and the ends of its arms stopping short of the sides of said top section, forming a square bottom section similar in size to said top section, folding said sections in quarters to form fold lines extended parallel to the arms of said cruciform opening, providing said sections with additional fold lines extended diagonally from corner to corner, attaching elongated members to the inner face of one of said sections with their lengths extended parallel to the diagonally extended fold lines and with their outer ends equally extended from between the adjacent faces of said sections of material at the corners thereof, superimposing said top section on said similar square bottom section of material, and bonding together the adjacent edge portions of said sections of material except at their corners.

17. A method of forming a sanitary holder, which comprises forming a square top section of material with a cruciform opening having its arms extended parallel to the sides thereof and the ends of its arms stopping short of the sides of said top section, forming a square bottom section similar to said top section, folding said sections in quarters to form fold lines extended parallel to the arms of said cruciform opening, providing said sections with additional fold lines extended diagonally from corner to corner, attaching members to the inner face of one of said sections of material which have plate-like carriers conformed to the corner shape of said sections of material and integral finger portions extended from between the adjacent faces of said sections of material at the corners thereof and in end alignment with said diagonally extending fold lines, superimposing said top section on a similar square bottom section of material, and bonding together the adjacent edge portions of said sections of material except at their corners.

18. A method of forming a sanitary holder, which comprises forming a square top section of material with a cruciform opening having arms extended parallel to the sides thereof, forming a similar square bottom section of material, coating one face of each of said sections of material with a layer of a pressure and heat sensitive material, folding said sections in quarters to form fold lines extended parallel to and aligned with the arms of said cruciform opening, providing said sections of material with additional fold lines extended diagonally from corner to corner, attaching elongated members to the inner face of said bottom section with their lengths extended parallel to and aligned with the diagonally extended fold lines and with their outer ends extended from between the adjacent faces of said sections of material at the corners thereof, superimposing said sections of material with their coated faces adjacent one another, and applying heat and pressure to said superimposed sections to bond together their edge portions except at the corners thereof.

19. A method of forming a sanitary holder, which comprises forming a square top section of material with a cruciform opening having arms extended parallel to the sides thereof, forming a similar square bottom section of material, coating one face of each of said sections of material with a layer of a pressure and heat sensitive material, folding said sections in quarters to form fold lines extended parallel to and aligned with the arms of said cruciform opening, providing said sections of material with additional fold lines extended diagonally from corner to corner, attaching elongated members to the inner face of said bottom section with their lengths extended parallel to and aligned with the diagonally extended fold lines and with their outer ends extended from between the adjacent faces of said sections of material at the corners thereof, superimposing said sections of material with their coated faces adjacent one another, applying heat and pressure to said superimposed sections to bond together their edge portions except at the corners thereof, and opening said sections of material along said fold lines to provide an upwardly directed central apex portion and a plurality of downwardly directed side pocket portions having the extended outer ends of said elongated members projecting from the bottom thereof.

LOLA A. CASNATI.

References Cited in the file of this patent

UNITED STATES PATENTS

| Number | Name | Date |
|---|---|---|
| 502,896 | Vine | Aug. 8, 1893 |
| 546,264 | Vine | Sept. 10, 1895 |
| 2,007,421 | Coughlin | July 9, 1935 |
| 2,096,130 | Phinirs | Oct. 19, 1937 |
| 2,373,651 | Casnati | Apr. 17, 1945 |
| 2,471,308 | Casnati | May 25, 1949 |
| 2,561,842 | Casnati | July 24, 1951 |